(12) United States Patent
Athreya et al.

(10) Patent No.: US 10,879,959 B2
(45) Date of Patent: Dec. 29, 2020

(54) MIMO ARCHITECTURE FOR MULTI-USER POWER LINE COMMUNICATION

(71) Applicant: Ohio State Innovation Foundation, Columbus, OH (US)

(72) Inventors: Kannan Srinivasan Athreya, Dublin, OH (US); Wei Sun, Columbus, OH (US); Bo Chen, San Francisco, CA (US); Vivek Sriram Yenamandra Guruvenkata, Lawrenceville, NJ (US)

(73) Assignee: OHIO STATE INNOVATION FOUNDATION, Columbus, OH (US)

( * ) Notice: Subject to any disclaimer, the term of this patent is extended or adjusted under 35 U.S.C. 154(b) by 0 days.

(21) Appl. No.: 16/750,638

(22) Filed: Jan. 23, 2020

(65) Prior Publication Data

US 2020/0244314 A1    Jul. 30, 2020

Related U.S. Application Data (60) Provisional application No. 62/796,125, filed on Jan. 24, 2019.

(51) Int. Cl.
*H04B 3/54* (2006.01)
*H04L 5/00* (2006.01)
(Continued)

(52) U.S. Cl.
CPC .......... *H04B 3/544* (2013.01); *H04B 7/0452* (2013.01); *H04L 5/0005* (2013.01); *G16Y 10/75* (2020.01)

(58) Field of Classification Search
CPC ............... H04B 1/0475; H04B 7/0417; H04B 2001/0425; H04B 7/0413; H04B 7/0615;
(Continued)

(56) References Cited

U.S. PATENT DOCUMENTS

| | | | | |
|---|---|---|---|---|
| 9,184,794 B1 * | 11/2015 | Ibrahim | ............... | H04B 7/0413 |
| 9,184,967 B1 * | 11/2015 | Ibrahim | ................... | H04B 3/54 |
| 9,749,100 B2 * | 8/2017 | Yonge, III | .............. | H04L 5/003 |

OTHER PUBLICATIONS

Hashmat et al. "MIMO communications for Inhome PLC networks: measurements and results up to 100 MHz"; 2010; IEEE pp. 120-124 (Year: 2010).*

(Continued)

*Primary Examiner* — Rahel Guarino
(74) *Attorney, Agent, or Firm* — Meunier Carlin & Curfman LLC (57) ABSTRACT

Power line communication (PLC) has significant benefits and advantages in comparison to wireless communication. By exploiting the power line infrastructure, PLC signals can cover a larger area and provide high speed data service without installation of new infrastructure, especially in remote rural areas where Ethernet is not available. A MIMO-based (multiple-input-multiple-output-based) power line communication structure (MU-MIMO-PLC) is described herein and exploits power line infrastructure to achieve MIMO communication and/or high data service. MU-MIMO-PLC exploits the spatiality of power line infrastructure and the multipath property of power line channel. MU-MIMO-PLC leverages these properties to achieve high data rates with MIMO technology. In one embodiment, a system for multi-user (MU) power line communication comprises a power line infrastructure; an access point connected to the power line infrastructure; and clients connected to the power line infrastructure, wherein the clients can communicate with the access point through the power line infrastructure simultaneously.

17 Claims, 4 Drawing Sheets

(51) Int. Cl.
    *H04B 7/0452* (2017.01)
    *G16Y 10/75* (2020.01)
(58) Field of Classification Search
    CPC .. H04B 17/336; H04B 1/0483; H04B 17/101; H04B 3/32; H04B 3/54; H04B 3/544; H04B 7/0452; H04B 3/542; H04B 2203/5445; H04B 2203/5454; H04L 25/03343; H04L 2025/03426; H04L 25/0204; H04L 27/2614; H04L 27/367; H04L 12/2801; H04L 12/2803; H04L 12/282; H04L 12/2834; H04L 5/0005; H04L 25/02; H04L 41/0896; H04L 12/281; H04L 12/2814; H04L 12/2818; H04L 12/2838; H04L 12/462; H04L 12/66; H03F 1/3247; H03F 1/3252; H03F 3/24; H03F 2200/451; H04W 88/085; H04M 3/34; H01Q 1/523
    See application file for complete search history.

(56) References Cited

OTHER PUBLICATIONS

2019. OctoClock-G CDA-2990. (2019). https://www.ettus.com/product/details/OctoClock-G1.
2019. TMDSPLCKIT-V3. (2019). http://www.ti.com/.
2019. USRP N210. (2019). https://www.ettus.com/product/details/UN210-KIT/.
Lars T Berger, Andreas Schwager, Pascal Pagani, and Daniel M Schneider. 2015. MIMO power line communications. IEEE Communications Surveys & Tutorials 17, 1 (2015), 106-124.
Alessio Canova, Nevio Benvenuto, and Paola Bisaglia. 2010. Receivers for MIMO-PLC channels: Throughput comparison. In Power Line Communications and Its Applications (ISPLC), 2010 IEEE International Symposium on. IEEE, 114-119.
Gabe Cohn, Erich Stuntebeck, Jagdish Pandey, Brian Otis, Gregory D Abowd, and Shwetak N Patel. 2010. SNUPI: sensor nodes utilizing powerline infrastructure. In Proceedings of the 12th ACM international conference on Ubiquitous computing. ACM, 159-168.
Carlos Giovaneli, Javad Yazdani, Paddy Farrell, and Bahram Honary. 2002. Application of space-time diversity/coding for power line channels. (2002).
Jayavardhana Gubbi, Rajkumar Buyya, Slaven Marusic, and Marimuthu Palaniswami. 2013. Internet of Things (IoT): A vision, architectural elements, and future directions. Future generation computer systems 29, 7 (2013), 1645-1660.
Rehan Hashmat, Pascal Pagani, Ahmed Zeddam, and Thierry Chonave. 2011. A channel model for multiple input multiple output in-home power line networks. In Power Line Communications and Its Applications (ISPLC), 2011 IEEE International Symposium on. IEEE, 35-41.
Rehan Hashmat, Pascal Pagani, Ahmed Zeddam, and Thierry Chonavel. 2010. MIMO communications for inhome PLC networks: Measurements and results up to 100 MHz. In ISPLC2010. IEEE, 120-124.
Emad S Hassan. 2017. Multi user MIMO-OFDM-based power line communication structure with hardware impairments and crosstalk. IET Communications 11, 9 (2017), 1466-1476.
Martin Hoch. 2011. Comparison of PLC G3 and PRIME. In Power Line Communications and Its Applications (ISPLC), 2011 IEEE International Symposium on. IEEE, 165-169.
Nasser Hossein-Zadeh, Peter Wolfs, et al. Distribution of Electrical Power to Rural Areas-Australian Experience and Implementation Possibility in Developing Countries. 5th National Energy Conference, 2005.
Stephen W Lai and Geoffrey G Messier. 2012. Using the wireless and PLC channels for diversity. IEEE Transactions on Communications 60, 12 (2012), 3865-3875.
Edward J Malecki. 2003. Digital development in rural areas: potentials and pitfalls. Journal of rural studies 19, 2 (2003), 201-214.
H Meng, Y Li Guan, and S Chen. 2005. Modeling and analysis of noise effects on broadband power-line communications. IEEE Transactions on Power delivery 20, 2 (2005), 630-637.
Holger Philipps. 2000. Development of a statistical model for powerline communication channels. In Proceedings of the 4th International Symposium on Power-Line Communications and its Applications (ISPLC). 5-7.
Bhaskaran Raman and Kameswari Chebrolu. 2007. Experiences in using WiFi for rural internet in India. IEEE Communications Magazine 45, 1 (2007), 104-110.
Angeliki M Sarafi, Georgios I Tsiropoulos, and Panayotis G Cottis. 2009. Hybrid wireless-broadband over power lines: A promising broadband solution in rural areas. IEEE Communications Magazine 47, 11 (2009).
Thierry Sartenaer and Paul Delogne. 2006. Deterministic modeling of the (shielded) outdoor power line channel based on the multiconductor transmission line equations. IEEE Journal on Selected areas in Communications 24, 7 (2006), 1277-1291.
Zhenyu Song, Longfei Shangguan, and Kyle Jamieson. 2017. Wi-fi goes to town: Rapid picocell switching for wireless transit networks. In Proceedings of the Conference of the ACM Special Interest Group on Data Communication. ACM, 322-334.
Lothar Stadelmeier, Dietmar Schill, Andreas Schwager, Daniel Schneider, and Joachim Speidel. 2008. MIMO for inhome power line communications. In Source and Channel Coding (SCC), 2008 7th International ITG Conference on. VDE, 1-6.
Bo Tan and John Tompson. 2012. Powerline communications channel modelling methodology based on statistical features. arXiv preprint arXiv:1203.3879 (2012).
Mohamed Tlich, Ahmed Zeddam, Fabienne Moulin, and Frederic Gauthier. 2008. Indoor power-line communications channel characterization up to 100 MHz Part I: one-parameter deterministic model. IEEE Transactions on Power delivery 23, 3 (2008), 1392-1401.
Mohamed Tlich, Ahmed Zeddam, Fabienne Moulin, and Frederic Gauthier. 2008. Indoor power-line communications channel characterization up to 100 MHz Part II: Time-frequency analysis. IEEE transactions on power delivery 23, 3 (2008), 1402-1409.
Alessandro Tomasoni, Raffaele Riva, and Sandro Bellini. 2012. Spatial correlation analysis and model for in-home MIMO power line channels. In Power Line Communications and Its Applications (ISPLC), 2012 16th IEEE International Symposium on. IEEE, 286-291.
Andrea M Tonello. 2007. Wideband impulse modulation and receiver algorithms for multiuser power line communications. EURASIP Journal on Advances in Signal Processing 2007, 1 (2007), 096747.
Fabio Versolatto and Andrea M Tonello. 2011. An MTL theory approach for the simulation of MIMO power-line communication channels. IEEE Transactions on power delivery 26, 3 (2011), 1710-1717.
Vivek Yenamandra and Kannan Srinivasan. 2014. Vidyut: exploiting power line infrastructure for enterprise wireless networks. In ACM SIGCOMM Computer Communication Review, vol. 44. ACM, 595-606.
Manfred Zimmermann and Klaus Dostert. 2002. Analysis and modeling of impulsive noise in broad-band powerline communications. IEEE transactions on Electromagnetic compatibility 44, 1 (2002), 249-258.
Manfred Zimmermann and Klaus Dostert. 2002. A multipath model for the powerline channel. IEEE Transactions on communications 50, 4 (2002), 553-559.

\* cited by examiner

MIMO ARCHITECTURE FOR MULTI-USER POWER LINE COMMUNICATION

CROSS-REFERENCE TO RELATED APPLICATIONS

This application claims the benefit of U.S. provisional patent application No. 62/796,125, filed on Jan. 24, 2019, and entitled "MIMO ARCHITECTURE FOR MULTI-USER POWER LINE COMMUNICATION," the disclosure of which is expressly incorporated herein by reference in its entirety.

BACKGROUND

For home networking and internet of things (IoT), the disruptive data, such as voice and video, needs to be accessible for the users at any time and at any place in the home, wherever the electronic devices are located. Home networking is required to support the high throughput, reliable coverage, and sustainable connectivity. However, the performance is dramatically decreased when the wireless signals go through the walls and ceilings. The densely deployed WiFi can serve a larger place, but the frequency handoff will decrease the throughput. Additionally, the IoT home requires deployment of many sensors such as, for example, cameras, smart thermostats, home energy monitors, and smart irrigation controllers at different places of the home to collect sensing data. Collecting sensing data from multiple IoT devices through wireless communication is inefficient due to signal attenuation and interference in home networking. Also, it takes some time and cost to deploy Ethernet connections in some remote rural areas, where power delivery infrastructure is available.

A power line infrastructure is widely deployed nowadays. In contrast to wireless communication such as WiFi, leveraging existing power line infrastructure for communication can increase the communication range. But power line cables are designed to deliver AC power signals at 50/60 Hz, which can attenuate high frequency signals heavily. Power line communication (PLC) is divided into two aspects: narrowband power line communication (3-500 KHz) and broadband power line communication (1.8-250 MHz). For broadband power line communication, focus is typically on the frequency between 30 MHz and 86 MHz. For home networking, there are two standards: IEEE1901 and HomePlug AV specifying how power line cables are employed to do communication. But IEEE 1901 and HomePlug AV cannot deal with the multiple data streams (i.e., more than two data streams) simultaneously transmitted on the power line.

Figure 1:
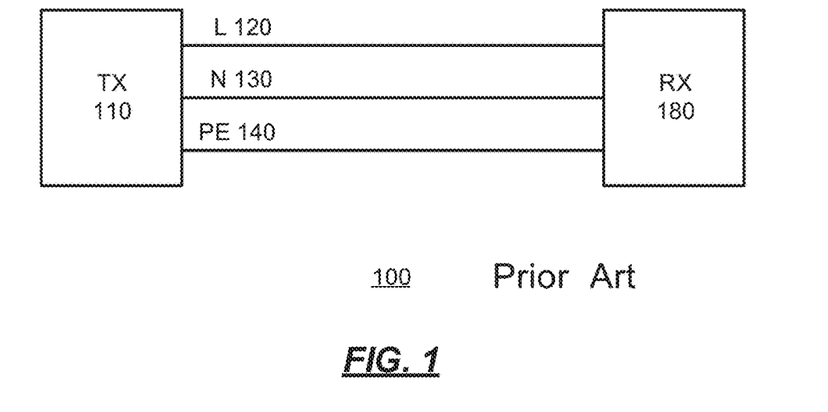
FIG. 1 is an example diagram useful for describing conventional MIMO-PLC architecture.

FIG. 1 is an example diagram useful for describing a conventional MIMO-PLC architecture represented as architecture 100. The architecture 100 leverages three wires (L 120, N 130, and PE 140) to do MIMO, which can just support a maximum of 2×4 MIMO realization.

More particularly, with this conventional MIMO-PLC architecture 100, there are three wires in the power line cable: live/phase (L/P referred to as L 120), neutral (N 130) and protected earth (PE 140). The single-input-single-output power line communication (SISO-PLC) just utilizes live-neutral (LN 120-130) pair as one port to feed and receive the data stream. The multi-input-multi-output power line communication (MIMO-PLC) utilizes any two wires of L 120, N 130, and PE 140 wire to transmit data. At the transmitter side TX 110, any two ports of L-N port, L-PE port, and N-PE port may be used due to Kirchhoff's law. At the receiver side RX 180, there is one additional port, which is indicated by the common mode (CM) signal. The CM signal is the voltage difference between the sum of three wires and the ground. When the transmitter TX 110 transmits on any two of three ports, the receiver RX 180 can receive data from four ports. A 2×4 MIMO on power line may be realized as shown in FIG. 1. Just two ports can be used at the transmitter side.

Even though there are many commercial PLC adapters in the market, these commercial PLC adapters suffer the performance improvement of the power line communication in the hybrid wireless and power line communication networks. Each commercial PLC adapter can just support a 2×2 MIMO. As the number of PLC adapters increases, the network performance degrades due to power line communication.

SUMMARY

Certain aspects of the present disclosure relate to power line communication (PLC). Power line communication has significant benefits and advantages in comparison to wireless communication. By exploiting the power line infrastructure, PLC signals can cover a larger area and provide high speed data service without installation of new infrastructure, especially in remote rural areas where Ethernet is not available.

Leveraging the existing power delivery infrastructure can achieve high data rate (e.g., high throughput), reliable coverage, and sustainable connectivity. It is with respect to these and other considerations that the various aspects and embodiments of the present disclosure are presented.

A networking architecture for power line communication to boost network performance, as the number of clients on the power line increases, is provided.

In an implementation, a system for multi-user (MU) power line communication comprises: a power line infrastructure; an access point connected to the power line infrastructure; and a plurality of clients connected to the power line infrastructure, wherein the plurality of clients simultaneously can communicate with the access point through the power line infrastructure.

In an implementation, a method for multi-user (MU) power line communication comprises: connecting at least one access point to a power line infrastructure; connecting a plurality of clients to the power line infrastructure; and permitting the plurality of clients to simultaneously communicate with the access point through the power line infrastructure.

In an implementation, a power line communication (PLC) structure comprises: a power line infrastructure; a transmitter connected to a first plurality of positions of a power line infrastructure; and a receiver connected to a second plurality of positions of the power line infrastructure, wherein a multiple-input-multiple output (MIMO) channel is created between the transmitter and the receiver.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

A multiple-input-multiple-output based power line communication structure (MIMO-PLC), also referred to herein as MU-MIMO-PLC, is described herein and exploits power line infrastructure to achieve multiple-input-multiple-output (MIMO) communication and/or high data service. MU-MIMO-PLC exploits the spatiality of power line infrastructure and the multipath property of power line channel. MU-MIMO-PLC leverages these properties to achieve high data rates with MIMO technology.

The effectiveness and scalability of MU-MIMO-PLC is validated. The multipath property in the power line infrastructure and the suitability of using MIMO technology to improve the performance of broadband power line communication are verified. As described further herein, MU-MIMO-PLC is scalable and boosts data rate on a power line, as well as outperforms current power line communication with conventional MIMO-PLC architecture.

The power delivery infrastructure was not originally designed for communication. The power line medium has high attenuation for frequencies other than 60 Hz (or 50 Hz in some countries). Still, there exist many standards that propose to use frequency bands on the power line that do not exhibit undesirably high attenuation for communication. Some bands allow long haul low data rate communication between smart homes and utility companies, and others allow in-house high data rate communication. Using power line for communication is desirable for many upcoming applications. Visible light communication (VLC) networks and internet of things (IoT) devices such as security cameras, for example, may use power lines as their network infrastructure to connect to the internet.

With any of the power line communication standards, only one node can transmit at a given time on a given frequency band. Therefore, when multiple nodes need to use the same shared power line, they need to take turns. This is not desirable for the applications when the nodes in such networks are large. In the wireless counterpart, however, multi-user techniques such as MIMO exist that enable scalable throughput with increasing nodes/users. Therefore, wireless networks are more desirable than wired networks. For MIMO techniques to work, the channel measured across transmitters and receivers should be independent of each other. In the wireless domain, due to multipath effects, the observed channel between different transmitter and receiver pairs are independent.

MIMO systems and methods on the power line are provided herein. The data rate linearly increases with increasing number of devices. 2×2 MIMO, 3×3 MIMO, and 1×N single-input multi-output (SIMO) are provided, for example.

In an implementation, the PLC architecture utilizes the power delivery infrastructure and distributes transmitter and receiver nodes along the power line. Transmitter nodes feed the data stream to the power line through one port such as an LN (live-neutral) port. The receiver node can receive the data from the same port. Because the transmitter and the receiver can connect to different positions of one power line, multi-input data streams transmitted at the transmitter side and multi-output data streams received at the receiver side are possible.

In some implementations, a scalable MIMO architecture on one power line is provided and can improve the throughput for power line communication. A multi-user (MU) MIMO is applicable on one power line, which can boost the throughput in power line communication through exploiting the spatiality of the power line infrastructure.

Figure 2:
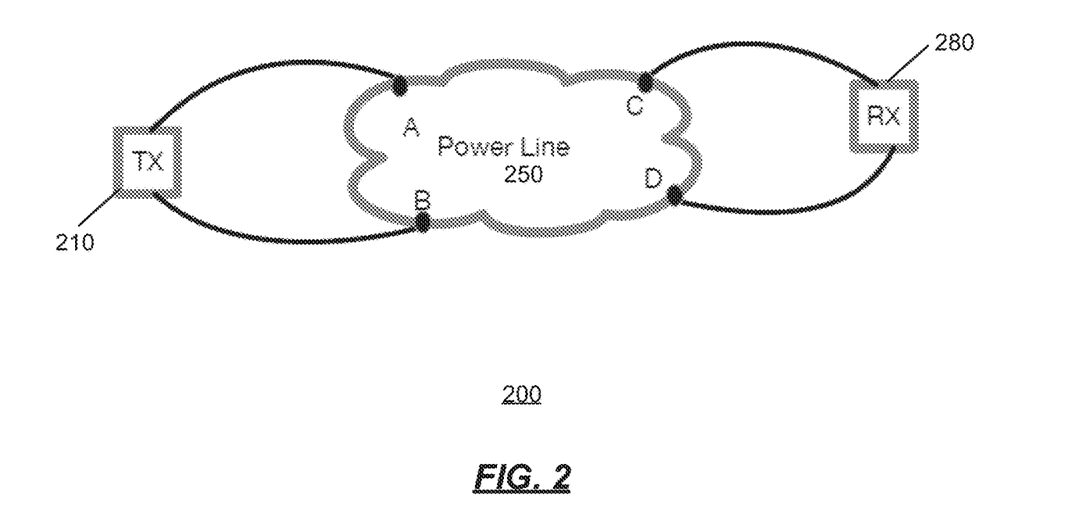
FIG. 2 is an diagram of an implementation of a 2×2 MU-MIMO-PLC architecture.

FIG. 2 is an diagram of an implementation of a 2×2 MU-MIMO-PLC architecture 200. A transmitter TX 210 connects to A and B positions of the power line grid, also referred to as the power line infrastructure which is also referred herein as a power line, such as power line 250. A receiver RX 280 connects to C and D positions of the power line 250. Thus, the transmitter 210 can transmit data through positions A and B on the power line 250, and the receiver can receive data through positions C and D on the power line 250. The MIMO channel between TX and RX is: TXA→RXC, TXA→RXD, TXB→RXC, TXB→RXD. There are different kinds of loads along power line 250, which can create rich scattering environment for power line communication. The PLC architecture provided herein is scalable. Any suitable transmitter and receiver may be used.

In practice, many remote rural areas cannot access the Internet. To leverage the power line infrastructure, MU-MIMO technology on the power line is used to allow them to access the Internet. In home networking, the IoT devices can be controlled with one access point (AP) through MU-MIMO technology in power line infrastructure. Any suitable AP may be used.

Figure 3:
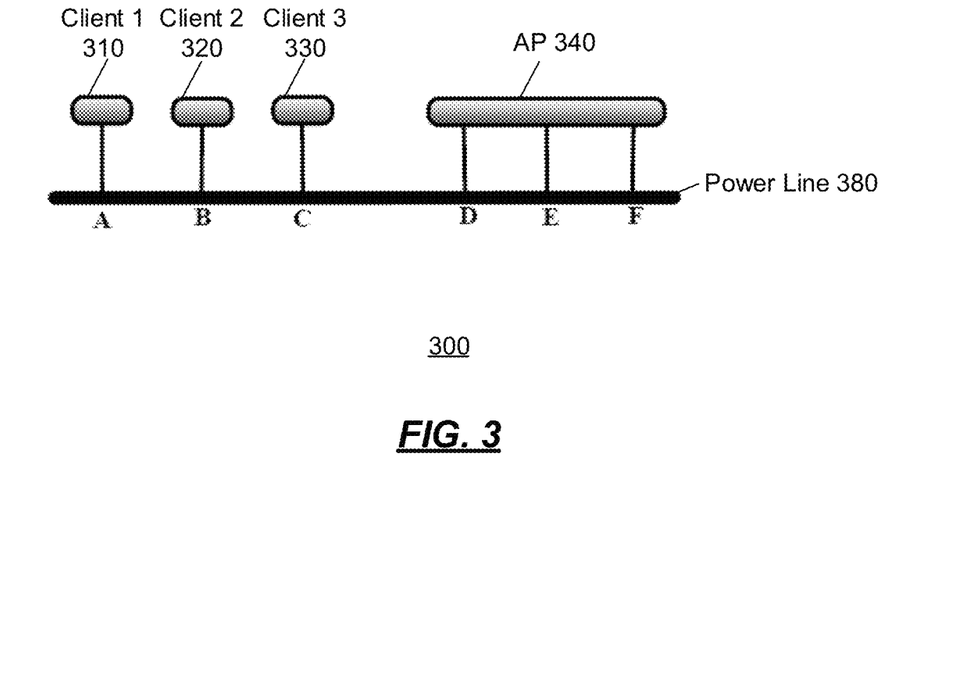
FIG. 3 illustrates an example of MU-MIMO-PLC architecture with three clients on the power line.

FIG. 3 illustrates an example of MU-MIMO-PLC architecture 300 with three clients 310, 320, 330 on the power line infrastructure which is also referred herein as a power line, such as power line 380. Each client 310, 320, 330 may be implemented using a variety of computing devices such as smartphones, desktop computers, laptop computers, tablets, set top boxes, vehicle navigation systems, and video game consoles. Other types of computing devices may be supported.

One AP 340 connects to D, E, and F positions of the power line 380. Three clients 310, 320, 330, connected to A, B, and C positions, respectively, of the power line 380 can communicate with this AP 340 through power line simultaneously. Thus, the AP 340 connects to the different positions of the power line 380 through the plug points. The number of connecting positions is equal to the number of clients. The AP 340 connects to the different positions (D, E, and F) of the power line 380 through the different plug points. Each client connects to the power line 380 through one plug point. As shown FIG. 3, three clients 310, 320, 330 connect to A, B, and C positions of the power line 380, respectively.

Alternatively, instead of one AP 340 being connected to the three positions D, E, F on the power line 380, additional APs may be used and separately connect to one or more of the positions on the power line 380.

The MU-MIMO architecture enables multiple clients to communicate with the AP simultaneously. Maximum likelihood detection can be used to detect the received signals with the known channel state information (CSI). However, the computational complexity is high when using maximum likelihood detection. To obtain the good performance and lower computational complexity, linear detection schemes may be used such as maximum ratio combining (MRC), zero-forcing beamforming (ZFBF), and minimum mean square estimation (MMSE).

With respect to downlink communication, the AP transmits data to all the clients through precoding technology called zero-forcing beamforming (ZFBF). The AP needs to know the downlink channel H before transmission. The AP transmits $H^H(HH^H)^{-1}x$ instead of x to all the clients. So each client receives the desired signal without interference from the other clients as shown in equation (1):

$$y = \begin{bmatrix} y_1 \\ y_2 \\ \ldots \\ y_3 \end{bmatrix} = HH^H(HH^H)^{-1}x + z \quad (1)$$

$$= x + z,$$

where y is the received symbol, ith element of y represents ith client's received symbol, and z represents the background noise.

Regarding the stability of the power line channel, one might wonder if the power line channel is stable to do ZFBF. To this end, do an experiment to show the stability of power line channel. First measure the power line channel. With this measured power line channel, perform zero-forcing precoding to achieve downlink transmission.

Figure 4:
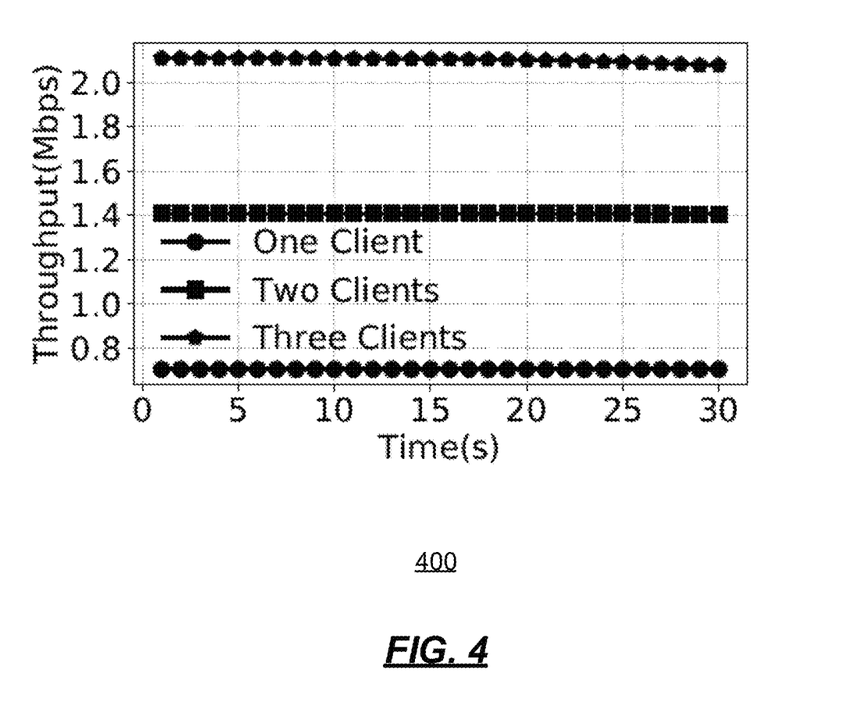
FIG. 4 is a chart that shows the throughput over 30 seconds when there are one client, two clients, and three clients.

FIG. 4 is a chart 400 shows the throughput over 30 seconds when there are one client, two clients, and three clients. It is shown that the power line channel is quite stable. In particular, the measured throughput is stable over 30 seconds, when there are one client, two clients, and three clients. This indicates that the downlink power line channel is stationary over seconds such that zero-forcing precoding for downlink communication can be performed. Therefore, ZFBF can be used for downlink transmission.

With respect to uplink communication, the clients on the power line can simultaneously transmit data to the AP. The AP decodes the data based on the received signals from the power line. The received signal is a linear combination of all the signals transmitted by the clients as shown in equation (2):

$$y = \begin{bmatrix} y_1 \\ y_2 \\ \ldots \\ y_n \end{bmatrix} = Hx + z = \begin{bmatrix} H_{11} & H_{12} & \ldots & H_{1n} \\ H_{21} & H_{22} & \ldots & H_{2n} \\ \ldots & \ldots & \ldots & \ldots \\ H_{n1} & H_{n2} & \ldots & H_{nn} \end{bmatrix} \begin{bmatrix} x_1 \\ x_2 \\ \ldots \\ x_n \end{bmatrix} + z, \quad (2)$$

where z is the background noise and the AP can decode the received data with $(H^H H)^{-1}H^H y$. For uplink communication, the AP estimates the channel H based on the predefined preambles.

Figure 5:
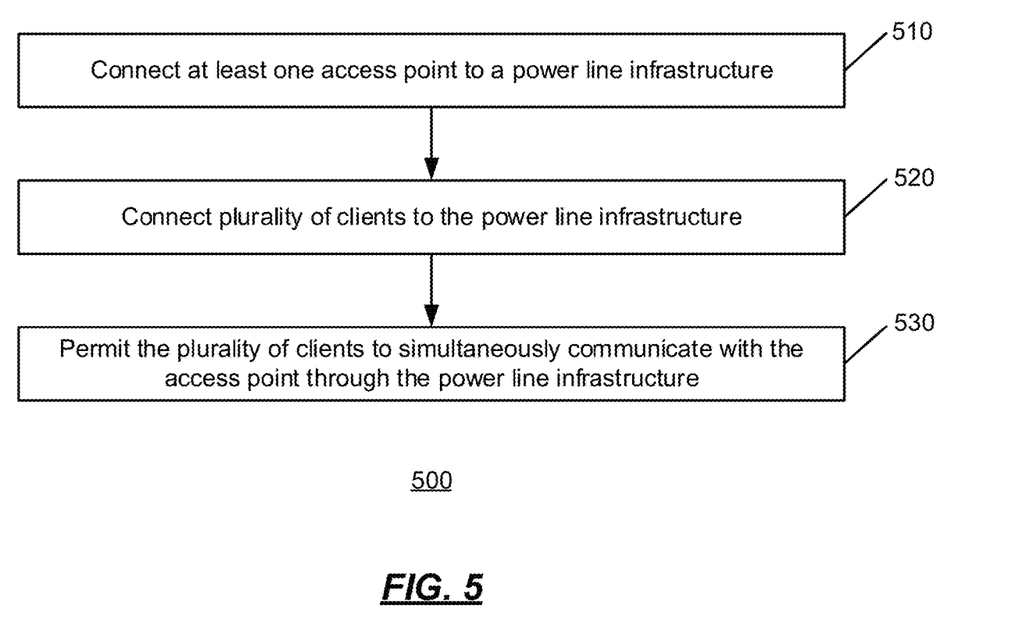
FIG. 5 is an operational flow of an implementation of a method of communication.

FIG. 5 is an operational flow of an implementation of a method 500 of communication. The method 500 may be implemented with respect to a power line infrastructure.

At 510, at least one access point is connected to a power line infrastructure. The access point may be connected to a plurality of different positions of the power line infrastructure, wherein the number of the plurality of different positions is equal to the number of the plurality of clients. In some implementations, a plurality of access points are each connected to a different position of the power line infrastructure.

The power line infrastructure comprises a MIMO power line communication structure, such as, for example, a MIMO OFDM-based (orthogonal frequency-division multiplexing-based) power line communication structure or a MIMO-based narrowband power line communication structure.

At 520, a plurality of clients are connected to the power line infrastructure. In some implementations, at least one transmitter node is connected to at least a first position on the power line infrastructure, and at least one receiver node is connected to at least a second position on the power line infrastructure, wherein each of the at least the first position is different than each of the at least the second position. In some implementations, a plurality of transmitter-receiver pairs are deployed along the power line infrastructure.

At 530, the plurality of clients simultaneously communicate with the at least one access point through the power line infrastructure.

Thus, a MU-MIMO architecture for power line communication is provided, which can enable MU-MIMO communication on power line infrastructure to achieve scalability and high throughput. The MU-MIMO architecture provided herein can boost the performance of power line communication. In contrast to the conventional MIMO architecture on a power line, the herein disclosed MU-MIMO architecture leverages the spatiality of power line cable rather than the number of wires in the power line cable to scale the power line communication.

By leveraging the power line infrastructure as described herein, the MU-MIMO-PLC systems and methods can provide high data-rate and wide range communication, which enables wide wireless applications. For example, wireless communication range can be increased with assistance of power line infrastructure. The MU-MIMO-PLC can improve the network performance of hybrid WiFi/PLC network and video surveillance system with HD cameras for traffic monitoring as shown in FIGS. 6(*a*) and 6(*b*).

Figure 6A:
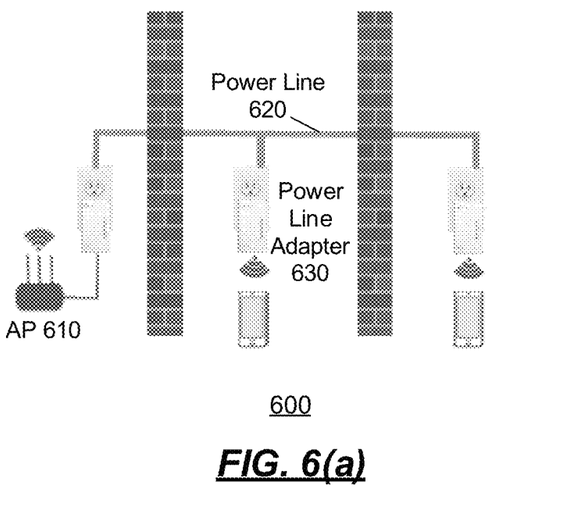
FIGS. 6(a) and 6(b) show applications of MU-MIMO-PLC communication.
Figure 6B:
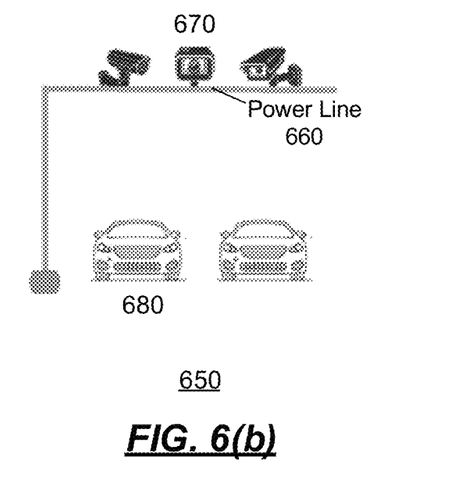

FIGS. 6(*a*) and 6(*b*) show applications of MU-MIMO-PLC communication. In FIG. 6(*a*), MU-MIMO-PLC 600 increases the communication range of wireless communication and improve the performance of hybrid WiFi/PLC network comprising an AP 610, a power line 620, and one or more power line adapters 630. In FIG. 6(*b*), MU-MIMO-PLC 650 can support the high data-rate for plugged-in IoT devices such as video streaming with monitoring camera system comprising a power line 660 and cameras 670 monitoring vehicles 680 for example.

Thus, the MU-MIMO-PLC architecture can enable many applications discussed above: network access in remote areas, hybrid wireless and PLC network and IoT networks.

More particularly, with respect to network access in remote or under-served areas, in many remote rural areas, there are no Ethernet connection or the wireless signals such as LTE are too weak to be acceptable. It takes some time and cost to install the Ethernet and build base stations in these areas. However, a power line infrastructure exists in these remote rural areas. Therefore, multi-user (MU) MIMO can be performed on power line to provide Internet service for areas such as these remote rural areas. The MU-MIMO-PLC architecture disclosed herein is unlike any conventional MIMO-PLC architecture which suffers from the high spatial correlation. The MU-MIMO-PLC architecture provided herein is scalable and provides high throughput communication.

With respect to hybrid wireless and power line communication, nowadays, WiFi network is so popular due to its high throughput and a large number of wireless users. However, WiFi network suffers from the limited communication range. Power line networks can extend the communication range of WiFi networks. The hybrid wireless and power line communications can leverage the advantages of WiFi network and power line communication to improve the network performance for wireless users with the MU-MIMO-PLC architecture provided herein.

With respect to enhancing performance of smart grid, a smart grid is developed to have efficient power delivery and consumption. To administer the smart grid system, the deployed sensors on the smart grid need to have high-throughput and efficient communication. The disclosed MU-MIMO-PLC architecture can be leveraged to enhance the performance of a smart grid system.

In one embodiment, a system for multi-user power line communication comprises a power line infrastructure; an access point connected to the power line infrastructure; and a plurality of clients connected to the power line infrastructure, wherein the plurality of clients can communicate with the access point through the power line infrastructure simultaneously. According to some aspects, the access point is connected to a plurality of different positions of the power line infrastructure, wherein the number of the plurality of different positions is equal to the number of the plurality of clients.

In an implementation, at least one transmitter node is connected to at least a first position on the power line infrastructure, and at least one receiver node is connected to at least a second position on the power line infrastructure, wherein each of the at least the first position is different than each of the at least the second position.

In an implementation, a plurality of transmitter-receiver pairs are deployed along the power line infrastructure. Each transmitter feeds RF signals through an LN port, and each receiver receives RF signals through the LN port.

In some embodiments, the power line infrastructure comprises a MIMO-OFDM-based (multiple-input-multiple-output, orthogonal frequency-division multiplexing based) power line communication structure. In other embodiments, the power line infrastructure comprises a MIMO-based narrowband power line communication structure.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system for multi-user power line communication, the system comprising:
    a power line infrastructure comprising multiple-input-multiple-output (MIMO) power line communication structure;
    a plurality of access points, wherein each of the plurality of access points is connected to a respective one of a plurality of different positions of the power line infrastructure; and
    a plurality of clients connected to the power line infrastructure,
    wherein the plurality of clients simultaneously can communicate with the access point through the power line infrastructure.

2. The system of claim 1, further comprising at least one transmitter node connected to at least a first position on the power line infrastructure, and at least one receiver node connected to at least a second position on the power line infrastructure, wherein each of the at least the first position is different than each of the at least the second position.

3. The system of claim 1, wherein the power line infrastructure comprises a MIMO OFDM-based (orthogonal frequency-division multiplexing-based) power line communication structure.

4. The system of claim 1, wherein the power line infrastructure comprises a MIMO-based narrowband power line communication structure.

5. The system of claim 1, further comprising a plurality of transmitter-receiver pairs deployed along the power line infrastructure.

6. The system of claim 5, wherein each transmitter feeds RF signals through an LN (live-neutral) port, and each receiver receives RF signals through the LN port.

7. The system of claim 1, wherein the access point is connected to a plurality of different positions of the power line infrastructure, wherein a number of the plurality of different positions is equal to a number of the plurality of clients.

8. A method for multi-user power line communication, the method comprising:
    connecting at least one access point to a power line infrastructure, wherein the power line infrastructure comprises a multiple-input-multiple-output (MIMO) power line communication structure, wherein the at least one access point comprises a plurality of access points, further comprising connecting each of the plurality of access points to a respective one of a plurality of different positions of the power line infrastructure;
    connecting a plurality of clients to the power line infrastructure; and
    permitting the plurality of clients to simultaneously communicate with the access point through the power line infrastructure.

9. The method of claim 8, further comprising connecting at least one transmitter node to at least a first position on the power line infrastructure, and connecting at least one receiver node to at least a second position on the power line infrastructure, wherein each of the at least the first position is different than each of the at least the second position.

10. The method of claim 8, wherein the power line infrastructure comprises a MIMO OFDM-based (orthogonal frequency-division multiplexing-based) power line communication structure.

11. The method of claim 8, wherein the power line infrastructure comprises a MIMO-based narrowband power line communication structure.

12. The method of claim 8, further comprising deploying a plurality of transmitter-receiver pairs along the power line infrastructure.

13. The method of claim 12, further comprising each transmitter feeding RF signals through an LN (live-neutral) port, and each receiver receiving RF signals through the LN port.

14. The method of claim 8, further comprising connecting the access point to a plurality of different positions of the power line infrastructure, wherein a number of the plurality of different positions is equal to a number of the plurality of clients.

15. A power line communication (PLC) structure comprising:
- a power line infrastructure;
- a transmitter connected to a first plurality of positions of a power line infrastructure; and
- a receiver connected to a second plurality of positions of the power line infrastructure, wherein the receiver comprises an access point connecting different positions of the power line infrastructure, and wherein a multiple-input-multiple output (MIMO) channel is created between the transmitter and the receiver.

16. The PLC structure of claim 15, wherein multi-input data streams are transmitted at a transmitter side, and multi-output data streams are received at a receiver side.

17. The PLC structure of claim 15, wherein the transmitter comprises a plurality of clients, and the receiver comprises an access point.

* * * * *